Dec. 12, 1933.     J. A. TAMMANY     1,938,727
TRAVELER'S ROSARY
Filed Feb. 2, 1933
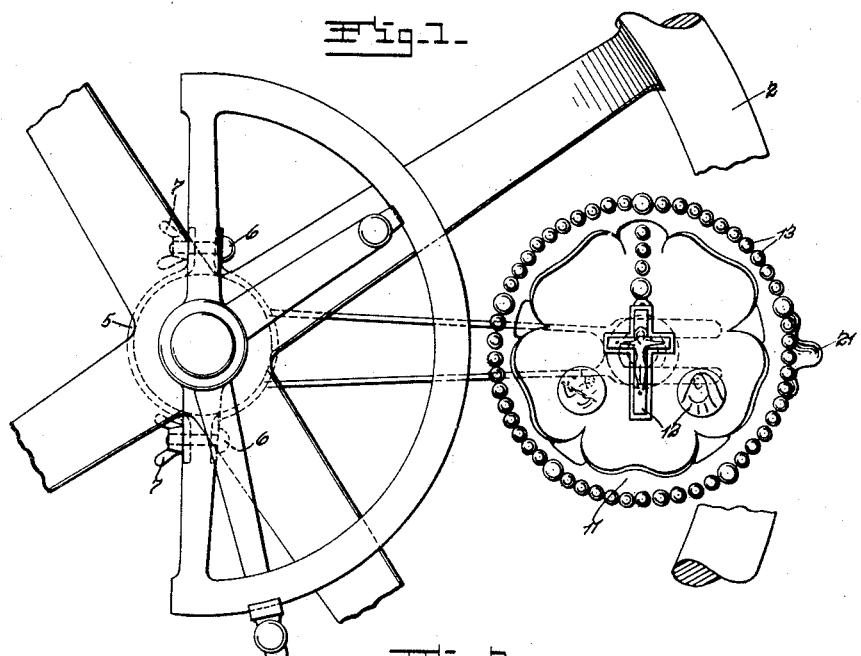
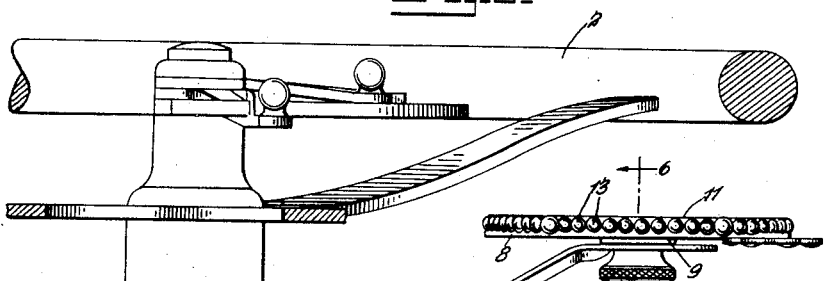
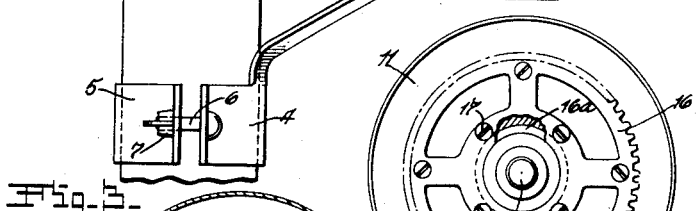
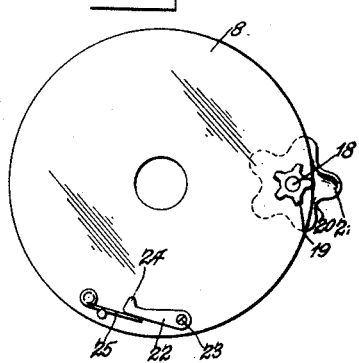
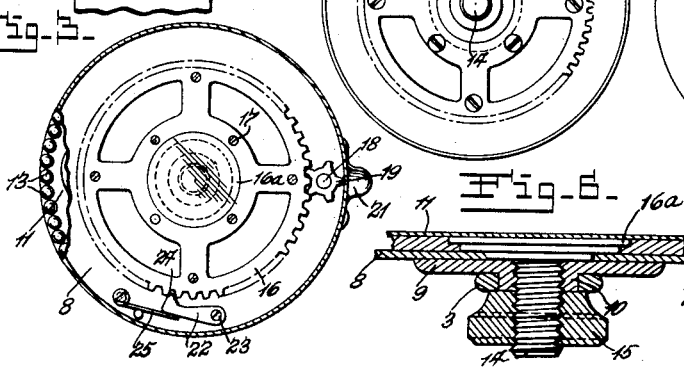
Inventor
Joseph A. Tammany
by Kippey & Kingsland
His Attorneys

UNITED STATES PATENT OFFICE 1,938,727

TRAVELER'S ROSARY

Joseph A. Tammany, Richmond Heights, Mo.

Application February 2, 1933. Serial No. 654,875

9 Claims. (Cl. 40—70)

This invention relates to travelers' rosaries; and a specific object of the invention is to provide a traveler's rosary comprising a support provided with means whereby the same may be rigidly attached to the steering column of an automobile and having a movable rosary device in connection therewith located and supported below and adjacent to the steering wheel of the automobile, so that the rosary device may be operated by a finger or part of a hand resting on the steering wheel.

Another object of the invention is to provide a rosary including a stationary support having a rotative rosary device mounted thereon, in combination with operating means for the rosary device whereby said device may be rotated step by step by intermittent operations of said operating means.

Other objects of the invention will be readily apparent from the following description, reference being made to the annexed drawing, in which—

Fig. 1 is a plan view of my improved traveler's rosary mounted in connection with the steering column of an automobile and in proper relationship to the steering wheel.

Fig. 2 is a rear elevation of the device in connection with the steering column of an automobile.

Fig. 3 is a view showing the actuating mechanism for the rosary device, a part of the latter being broken away.

Fig. 4 is an inverted plan view of the rotary rosary device showing the operating gear therefor.

Fig. 5 is a bottom plan view of the device, a portion being broken away to show the relationship of other parts.

Fig. 6 is a vertical sectional view on the line 6—6 of Fig. 2.

The part 1 is the familiar stationary column in which the usual rotative steering post is mounted, the steering wheel 2 being attached to the upper end of the steering post.

The rosary, constituting a part of the present invention, is rotatively supported at the upper end of an arm 3 rigidly attached to the steering column 1. The lower end of the arm 3 is formed with an arcuate clamping portion 4 adapted to cooperate with a clamping clip 5. Clamp screws 6 extend through extended end portions of the parts 4 and 5 and are equipped with nuts 7 whereby the clamp may be attached and released.

A disc 8 is attached to a member 9 having an extension 10 with flat sides extending into a slot in the upper end of the arm 3, thereby holding the member 9 and the disc 8 from turning.

The rosary member comprises a rotary disc 11 having its upper surface appropriately shaped as a medallion representing sacred images 12. The marginal portion of the rosary member is equipped with an annular series of semi-spherical protruding parts 13 representing the beads of a rosary.

A threaded axle member 14, in pivotal connection with the axis of the under side of the disc 11, extends downwardly through a hole provided therefor through the parts 8, 9 and 10 and a nut 15 is screwed on the lower end of said axle member 14. In this way, the entire rosary device is held in connection with the upper end of the arm 3 in a relationship in which the disc 11 may be rotated while the parts 8 and 9 are held from rotating by the engagement of the extension 10 in the arm 3.

A circular rack 16 is attached to the under side of the disc 11 by screws 17, and has pivotal engagement 16ª with the axle member 14 to permit rotation of the disc 11 with respect to the support 8.

An axle member 18 extends vertically through the disc 8 beyond the periphery of the rack 16 and has attached to its upper end a pinion 19 meshing with the rack 16. A member 20, having a series of outwardly extending arms 21, is attached to the lower end of the axle member 18. Only one of the arms 21 extends substantially beyond the periphery of the disc 8 in any of the steering positions of said member. Thus, it is free to rotate the member 20 a single step or space by the movement of a finger in the proper direction along the periphery of the disc 8. The finger will eventually move beyond and out of engagement with the arm 21 that had been engaged by the arm finger and the member 20 will then stop with another arm extending beyond the periphery of the disc 8 in position for engagement by a finger of the operator. Each of these intermittent turning movements of the member 20 is sufficient only to impart a turning movement to the disc 11 equal to the distance or space between the axes of the bead representations 13, so that each turning movement of the member 20 moves the rosary device, including the bead representations 13, exactly the proper distance.

A detent for cooperation with the remaining features to engage the circular rack 15, and thereby yieldingly hold the rotary rosary member in its different starting positions, is provided. This detent comprises an arm 22 mounted on a pivot 23 supported by the disc 8. The arm 22 has a tooth 24 adapted to engage between any two adjacent teeth of the circular rack 16. The arm 22 is actuated by a spring 25 to hold the tooth 24 against the periphery of the rack 16 and to engage between the teeth of said rack and thus stop the rack 16 and the attached disc 11 in the different step by step positions to which said parts are moved by operation of the member 20.

The foregoing constitutes an embodiment of means for supporting a rotary rosary device for rotation about an axis approximately parallel with the steering wheel 2 of an automobile. The device may be adjusted in proper spaced relationship with respect to said steering wheel, so that one or more fingers of the hand of the driver of the automobile may conveniently be extended downwardly to operate against and along the periphery of the disc 8 and engage an extended arm 21 to impart turning movements to the disc 11. In this relationship, the outer peripheral portions of the discs 8 and 11 are in approximate alinement with the outer peripheral surface of the steering wheel 2. The device is separated from the steering wheel 2 by an intervening space, so that there is no interference with the free movements of the hands of the operator as the hands are moved to turn the steering wheel. However, the fingers of the hand of the driver may be extended downwardly to operate the rosary device without the least inconvenience or change of position other than extending one or more of the fingers downwardly.

This invention may be manufactured, sold and attached economically and without difficulty. The driver of the automobile is thus enabled to operate the rosary without looking away from the roadway along which the automobile is moving, so that uninterrupted vision may be devoted to driving and steering the automobile in a proper manner.

The device may be made of various substances and materials and appropriately ornamented or decorated and provided with any desired or required sacred representations. The invention may be varied within the entire scope of equivalent limits without departure from the nature and principle of the invention. I do not restrict myself unessentially in any particulars, but what I claim and desire to secure by Letters Patent is:

1. A device of the character described comprising a stationary support, a rotative element supported adjacent to said support, a series of rosary bead representations carried by said rotative element, and mechanism carried by said stationary support for imparting intermittent movements to said rotative elements equal to the distances between the axes of said bead representations respectively.

2. A device of the character described comprising a supporting member, a rotative element mounted in connection with said supporting member, a series of rosary bead representations in rigid connection with said rotative element, mechanism carried by said supporting member for imparting intermittent rotative movements to said rotative element equal to the distances between the axes of said bead representations respectively, and means for supporting said supporting member in connection with the steering column of an automobile in position to hold said supporting member and said rotative element a predetermined space below the steering wheel of the automobile.

3. A device of the character described comprising a supporting member, means for holding said supporting member in a stationary position, a rotative element mounted adjacent to said supporting member, a series of rosary bead representations in connection with said rotative element, a rotary actuator carried by said supporting member, and gear mechanism operated by said actuator for imparting intermittent rotative movements to said rotative element, each equal to the distance between the axes of adjacent ones of said bead representations.

4. A device of the character described comprising a rotative element having in connection therewith representation of a series of rosary beads, a support for supporting said rotative element adjacent to and below the steering wheel of an automobile, and mechanism carried by said support and operated by one of the driver's hands resting on the steering wheel to impart intermittent rotative movements to said element, each equal to the distance between the axes of two adjacent bead representations.

5. A device of the character described comprising a stationary support mounted adjacent to and below the steering wheel of an automobile, a rotative element mounted above said support and having in connection therewith a continuous series of rosary bead representations, mechanism mounted on said support and operated by one of the driver's hands that rests on the automobile steering wheel for intermittently moving said rotative element distances equal to the distance between the axes of two adjacent bead representations, and means for preventing accidental movement of said rotative element.

6. A device of the character described comprising a rotative element, an annular series of rosary bead representations rigid with and visually protruding from said element, a stationary support on which said element is mounted, an annular rack attached to said element adjacent to said support, a pinion rotatively carried by said support and engaging said rack between said support and said element, and a device attached to said pinion and having parts extending successively beyond said support for manual engagement and operation to rotate said pinion.

7. A device of the character described comprising a stationary support, a rotative disc mounted adjacent to said support, a continuous series of rosary bead representations rigid with and operated by said disc and visually protruding therefrom, gearing between said rotative disc and said support for imparting rotative movements to said disc, and a rotary actuator connected with said gearing and extending beyond said support for manual engagement and operation to rotate said disc.

8. A device of the character described comprising a stationary support, a rotary disc, means for supporting said disc in connection with said support, a series of rosary bead representations rigid with and visually protruding from said disc, yielding means holding said disc against undesired rotation with respect to said support, and mechanism for imparting step by step rotative movements to said disc successively, each of said movements equalling the distance between the axes of two adjacent bead representations.

9. A device of the character described comprising a stationary support, a mounting for holding said support in connection with the steering column and below the steering wheel of an automobile, a rotative disc mounted in connection with said support, a series of rosary bead representations integral with and visually protruding beyond the marginal portion of said disc, an annular rack attached to the side of said disc that is toward said support, a rotative pinion mounted at the side of said support that is toward said disc and permanently meshing with said rack, means at the outer side of said support and connected with said pinion for imparting intermittent step by step rotative movements to said pinion and thereby to said rack and said disc, and means carried by said support for holding said disc against undesired rotation.

JOSEPH A. TAMMANY.